United States Patent Office 2,798,811

Patented July 9, 1957

2,798,811

INHIBITING MICRO-BIOLOGICAL GROWTH IN BEER

John Burggraf Bockelmann, Tenafly, and Frede B. Strandskov, Verona, N. J., assignors to The F. & M. Schaefer Brewing Co., Brooklyn, N. Y., a company of New York No Drawing. Application July 23, 1953, Serial No. 369,959

6 Claims. (Cl. 99—48)

The present invention relates to the control of micro-biological growth in beer, particularly in finished beer in a bottle, can or other container by means of the antibiotics, polymyxin and/or thiolutin, alone or in association with such antibiotics as penicillin, streptomycin and the like.

In the control of micro-biological contamination of beer, one deals with the contaminating micro-organisms which may be present during the fermentation in the brewery, the contaminating yeasts picked up during the brewing process after fermentation is completed, and the air borne baceteria and yeasts which may develop after the beer has been bottled. As described in an article by J. L. Shimwell in Wallerstein Laboratories Communications, volume 12, pages 71–88 (1949), the bacteria present in beer include Gram-positive rods and cocci. The Gram-positive rods that are encountered as contaminants are *Lactobacillus pastorianus* or closely related species and the cocci are of the *Pediococcus damnosus* type.

The antibiotic polymyxin is generally not considered as being active against the Gram-positive bacteria. The specificity for Gram-negative bacteria is pointed out in a paper by P. G. Stansley, R. G. Shepherd and H. J. White in Bulletin of the Johns Hopkins Hospital, volume 81, No. 1, pages 43–54 (1947), or in the Annals of the New York Academy of Sciences, volume 51, pages 853–1000 (1949).

The antibiotic, thiolutin, is produced by certain strains of *Streptomyces albus* and is characterized by its high sulphur content and yellow color. Cultures of thiolutin-producing strains of *S. albus* grow at 28–30° C. under submerged conditions on several organic media with production of the antibiotic. In fermentation broths, thiolutin is quite stable at acidic and neutral conditions but is unstable in alkaline broth. Thiolutin is assayed by either a cylinder plate method using *Bacillus subtilis* (PCI 219) or a turbidimetric method employing *Klebsiella pneumoniae* (PCI 602). The latter method is essentially that by Kersey for the assay of terramycin, Kersey, R. C., J. Am. Pharm. Assoc., Sci. Ed., 39, 252–253, 1950.

Thiolutin exhibits no acidic or basic properties. It crystallizes readily as optically-inactive needles having a brilliant yellow color. The crystals do not have a definite melting point; they darken at about 255° C. and remain intact above 270° C. Thioluton may be sublimed quantitatively in vacuo at about 240–250° C. It is sparingly soluble in water (210 mg./liter at room temperature).

Thiolutin exhibits a characteristic absorption curve in the ultra-violet region with maxima occurring at 284 and 314 mu and a shoulder at 245 mu. Characteristic absorption is also exhibited in the infrared region.

Thiolutin is active against a wide variety of micro-organisms including Gram-positive and Gram-negative bacteria and many fungi. Thiolutin is somewhat less active than terramycin but it is equal to, or more active than, streptomycin against bacteria. *Trichophyton gypseum* and *Candida albicans* strains are completely inhibited by 5 micrograms per ml. or less. The Alternaria, Septoria, Endothia and Nematospora cultures are effectively inhibited by 5 micrograms of thiolutin per ml.

When administered orally, in mice, the LD0 toxicity is about 1.5 mg. per kg. of body weight. When suspended in sesame oil, peanut oil or water and administered subcutaneously, the LD0 is in the order of 75 mg. per kg. Daily subcutaneous administration of 40 mg. per kg. for five days produces no toxic symptoms or renal damage in rats. Likewise, 1 ml. of aqueous solution containing 100 micrograms of thiolutin may be administered intravenously to mice twice daily for five days without untoward effects. Thioluton is not hemolytic.

The use of antibiotics for the inhibition of micro-biological growth in finished beer has heretofore been considered to provide too little promise as a new means for the elimination of unwanted organisms from the potable beverage. The antibiotic may be unstable under the conditions of fermentation. The antibiotic may possess a sufficiently broad bacterial and yeast spectra so that the addition which is made during the fermentation process will likely have an unfavorable effect upon the yeast to thereby poison and terminate the fermentation at an undesired end point. Such antibiotics as gliotoxin, lupulon, humulon, pyocyanin and streptothricin inhibit or inactivate the growth of yeast cells.

Wallerstein Laboratories Communications, March 1953, at page 95, mentions attempts by Russian workers to control micro-biological growth in alcohol fermentation by the use of penicillin (Chem. Abstracts, 46, 13:6320 (1952)).

Lund in a discussion of a paper by Baetsle during the proceedings of the International Congress of Microbiology at Copenhagen, Denmark, in 1947, called attention to the usefulness of penicillin against beer spoilage lactic acid bacteria.

However, penicillin, per se, has not been found to be effective for the control of the micro-organisms associated with beer spoilage.

However, this antibiotic does not appear to satisfy the many requirements necessary in the control of undesirable micro-biological flora during the fermentation process due to the ineffectiveness of crude penicillin and the inactivation of penicillin in the beer. Thus the use of penicillin, alone, appeared to be too indecisive to warrant its adaptation for commercial alcohol production.

The properties of terramycin, streptomycin, dihydro-streptomycin and penicillin are so well known and completely described in the art that any further description of these is unnecessary in the description of the present invention.

The use of an antibiotic to control microbial growth and flora during or after brewing operations must not introduce a dangerous reagent which would convert a potable beverage into a drug. From experience gained in the study of antibiotics, it has been considered that preparations containing more than 50 grams of antibiotics per ton are to be classified as drugs. In view of the high dosages of certain of the antibiotics which are required for the inhibition of bacterial growth of the type present in finished beer, it was surprising indeed that as little as 1 gamma/ml. of thiolutin in association with minute quantities of other antibiotics, 1.5 gamma per ml. of the antibiotics penicillin or polymyxin and these combined with the other antibiotics of the invention eliminate the micro-biological growth in the finished beer.

In co-pending application Serial No. 336,873, by the inventors of the present application, mention is made of the surprising effect obtained by the addition of very small amounts of polymyxin, of the order of a few hundredths of a gamma per milliliter to control *Flavobacterium proteus* and its related strains which contaminate the yeast used in brewery fermentation. *Flavobacterium proteus* is a Gram-negative organism and in view of the known anti-bacterial spectrum of polymyxin it is surprising indeed that in accordance with the present invention that polymyxin and thiolutin should be effective against micro-biological growth which includes secondary yeast *Lactobacillus pastorianus,* its closely related species and the cocci, *Pediococcus damnosus.*

In addition to these bacterial contaminants which are found in finished beer, yeast (air borne or from other sources) contaminates the beer during its manufacture so as to induce secondary yeast growth in unpasteurized beer under the favorable conditions for microbial and yeast growth which are usually had in the storage of the finished beer in containers.

The bacterial and yeast contamination seriously affects the taste, odor and potability of the beverage. Differing degrees of contamination make for non-uniformity in the quality and taste and odor of the finished beer. As is known, the effect of heat in beer manufacture such as during pasteurization upon the taste of the finished beer, has caused considerable difficulty in brewing. Considerable study has been made to obtain the proper conditions so as to maintain the necessary uniform control for the production of beer of uniform good quality and uniform taste.

Attempts have been made in Europe to control bacterial infection in finished yeast. For example, in Denmark, a substance K–5, understood to be bromacetic acid in 60% water solution, has been recommended as an additive in an amount of from 3 to 5 parts per million, but this agent is very toxic and is therefore undesirable.

An object of the present invention is to provide a finished beer in which microbial growth is inhibited by an antibiotic (such as polymyxin, or a mixture of polymyxin and terramycin) in admixture with thiolutin in an inhibiting amount for the control of said growth and to further prevent the development of any off-taste or non-uniformity in taste of stored beer which may or may not have been pasteurized and in which contamination by *Lactobacillus pastorianus, Pediococcus damnosus* and secondary yeast is likely.

A further object of the present invention is to provide a method for the inhibition of microbial growth in beer and for the prevention of undesired development of bad tastes and odors in such beer due to said microbial growth by the addition of the antibiotic thiolutin together with polymyxin, alone or together with terramycin, to the beer, which beer need not therefore be pasteurized.

Other and further objects of the present invention will appear from the more detailed description set forth below, it being understood that such detailed description is given by way of illustration and explanation only and not by way of limitation, since various changes therein may be made by those skilled in the art without departing from the scope of the present invention.

Studies have been made by the present inventors with other antibiotic materials, alone and in various combinations, in order to determine if the unusual action of polymyxin against *L. pastorianus* and *P. damnosus* is shared by any other antibiotic among those which are commercially available and at the same time studies were made to determine whether any other antibiotics permitted the control of secondary yeast infection.

The pasteurized beer which is used is free from all viable micro-organisms. The secondary yeast count is of the order of 10–100 cells/ml. and the bacterial count in the unpasteurized beer is extremely low (a few per ml.).

A concentration of the particular antibiotic or antibiotics employed in an aqueous stock solution is added (1 ml. aliquot) to the clean empty beer bottle and unpasteurized beer is added to the bottle so that the final volume gives the desired antibiotic concentration in the beer.

A control bottle is filled with the same unpasteurized beer, no addition of antibiotic being made, and all of the bottles including the control are carefully capped and incubated at room temperature (75° F.) for nine weeks. A pasteurized control is also made up by carefully observing the pasteurization conditions normally employed.

As set forth in Table I, after nine weeks of incubation at 75° F. a haze and heavy sediment appear in the unpasteurized control, whereas the pasteurized control is clear and a very light sediment (normal sediment) is observed with this latter. This normal sediment is the sediment which is found in practically every bottle of beer which has been pasteurized and which has been standing for a like period of time. This normal sediment consists primarily of denatured proteins and may also contain a few dead yeast and bacterial cells as the result of agglomeration after the filtration step and following pasteurization.

The haze and sediment are separately examined microscopically and by plating techniques to determine qualitatively and semi-quantitatively the nature of the microbiological infection. In cases where haze and no sediment is formed, the haze is also examined by plating techniques to determine the presence of viable microorganisms in the beer.

As indicated in Table I, thiolutin added to the unpasteurized beer and stored for nine weeks at 75° F. shows a haze and light sediment and the composition of the haze and sediment, examined microscopically as above indicated, shows the absence of secondary yeast growth but also shows the Gram-positive bacterial rods and cocci of the species *L. pastorianus* and *P. damnosus.* The haze in the supernatant liquid is indicative of a bacterial population of from about $10\times10^6$ to $100\times10^7$ of these bacteria rods and cocci per ml. of beer which is infected. No external infection of the beer is provided for in the examples of the present application since the natural infection which occurs in the examples as are set forth in the application represents the closest conditions to simulate the conditions which occur during the normal process. When the above Gram-positive cocci and rods are added to the unpasteurized beer in controlled quantities, even in larger amounts, through artificial infection, the haze and heavy sediment results in a much shorter time and the results obtained in either Table I or Table II are not altered in so far as the effectiveness of each of the antibiotics and their combinations are shown in these tables.

Bacitracin, subtilin, streptomycin, dihydrostreptomycin and terramycin, separately or in combination, added to the beer in the amount of 5 gamma/ml. for each antibiotic, permit a condition of haze and sediment corresponding to bacterial growth of the rods and cocci in the range of $10\times10^6$ to about $10\times10^7$. As shown in Table I when these are each combined with 5 gamma/ml. (of finished beer) of thiolutin, the same bacterial contamination in about the same amount is had, thereby indicating that thiolutin has controlled the secondary yeast infection but that the particular antibiotic has failed to control the bacterial infection.

Surprisingly and as is shown in Table I, thiolutin with polymyxin substantially eliminates sedimentation beyond that found in the normal pasteurized control and further the unpasteurized beer is clear to show the absence of viable micro-organisms. Unpasteurized beer so treated is as clear as the beer in the pasteurized control stored for the same period of time and at the same temperature. The non-bacterial sediment (protein, etc.) in unpasteurized beer treated with thiolutin and polymyxin is surprisingly less in amount than the non-bacterial sediment in the pasteurized control.

In Table II, the effect of concentration of polymyxin with thiolutin is shown and is compared with the unpasteurized control and the pasteurized control under the same conditions as are set forth in the above with respect to Table I.

It is seen from Table II that a concentration varying from 0.03 gamma to 0.3 gamma/ml. of polymyxin in combination with from 1–3 gamma/ml. of thiolutin still permits the growth of the Gram-positive bacterial rods and to a slightly lesser extent the cocci. However, about 0.5 gamma/ml. of polymyxin with thiolutin provides a satisfactory control of the bacterial contamination which is comparable to that found in the pasteurized control. The thiolutin appears to be most effective for the control of yeast and for its combined effect with the anti-bacterial antibiotic at concentrations of about 1 gamma/ml. or slightly less, but more than 0.5 gamma/ml. This same effect is likewise had with polymyxin but is not shared with any of the ineffectual antibiotics as indicated in Table I.

Another series of runs were made under the conditions presented in Tables I and II in which terramycin, polymyxin and thiolutin are combined in equal amounts varying from about 3 to 5 gamma/ml. each with respect to the finished beer. Terramycin although substantially ineffectual with thiolutin, alone, provides a perceptible improvement in combination with polymyxin and thiolutin together. A lower concentration of polymyxin is effective in combination with terramycin when these two are added to thiolutin, and this controls micro-biological growth at least as effectively as the pasteurized control. Above a minimum of polymyxin of about 0.5 gamma/ml., some of the polymyxin above this minimum may be replaced by a somewhat larger amount of terramycin in the combination of this antibiotic with thiolutin.

It has been further found that the combination of polymyxin with thiolutin permits the minimum effective dose to be reduced still further for the former where the amount of thiolutin is reduced to about 1.0 gamma/ml. The absence of heavy sediment in these antibiotic combinations appears to indicate that the proteins are retained and not precipitated so that these would appear to support a synergistic action both with respect to the inhibition of micro-biological growth and with respect to the prevention of precipitation of proteins which so adversely affects the flavor of the beer in unpasteurized beer storage and in pasteurized beer storage.

The polymyxin used in arriving at the data set forth in the Tables I and II is polymyxin B. Polymyxin A, polymyxin C or polymyxin D are equally effective as polymyxin B. Further, these latter polymyxins may be used in admixture to provide the beneficial results of the invention. However, polymyxin B is preferred.

*Table I*

| Antibiotics Added | Condition of Beer in Bottles After 9 weeks at 75° F. | Composition of Haze and Sediment |
|---|---|---|
| none (unpasteurized control). | haze and heavy sediment. | secondary yeast+Gram-positive bacterial rods and cocci. |
| thiolutin (5 gamma/ml.) | haze and light sediment. | Gram-positive bacterial rods and cocci. |
| thiolutin, bacitracin (5 gamma each). | do | Do. |
| thiolutin, subtilin (5 gamma each). | do | Do. |
| thiolutin, streptomycin (5 gamma each). | do | Do. |
| thiolutin, dihydrostreptomycin (5 gamma each). | do | Do. |
| thiolutin, penicillin (5 gamma each). | clear and very light sediment. | normal sediment. |
| thiolutin, terramycin (5 gamma each). | haze and light sediment. | Gram-positive bacterial rods and cocci. |
| thiolutin, polymyxin (5 gamma each). | clear and very light sediment. | normal sediment. |
| none (pasteurized control) | do | Do. |

*Table II*

| gamma/ml. | | Condition of Beer After 9 weeks at 75° F. | Composition of Haze and Sediment |
|---|---|---|---|
| Polymyxin | Thiolutin | | |
| [1] 0 | 0 | haze and heavy sediment. | Gram-positive bacterial rods and cocci + secondary agent. |
| 3.0 | 3.0 | clear and very light sediment. | normal sediment. |
| 1.0 | 3.0 | do | Do. |
| 0.3 | 3.0 | clear and light sediment. | Gram-positive bacterial rods. |
| 0.1 | 3.0 | do | Gram-positive bacterial rods and cocci. |
| 0.03 | 3.0 | do | Do. |
| [2] 0 | 0 | clear and very light sediment. | normal sediment. |

[1] None (unpasteurized control).
[2] None (pasteurized control).

From practical considerations, the maximum concentrations of the antibiotics depend upon the solubilities of thiolutin, polymyxin, penicillin, and terramycin and upon the prohibition against producing a finished beer containing the antibiotics in drug forming amounts; in the interests of economy and uniformity of control of micro-biological growth, lesser antibiotic concentrations rather than greater antibiotic concentrations are preferred, even though the latter are operative.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described being merely preferred embodiments thereof.

What is claimed is:

1. A method of inhibiting micro-biological growth in beer, which comprises incorporating the antibiotic polymyxin in combination with the antibiotic thiolutin in the beer in an amount of from about 0.5 gamma to about 5.0 gamma of polymyxin per milliliter of finished beer and of from about 1.0 gamma to about 3.0 gamma of thiolutin per milliliter of finished beer.

2. A method of inhibiting the micro-biological growth of *Lactobacillus pastorianus, Pediococcus damnosus* and secondary yeast in beer, which comprises incorporating the antibiotics polymyxin and thiolutin into the beer in an amount of about 1.0 gamma to about 3.0 gamma of polymyxin per milliliter of finished beer and of about 3.0 gamma of thiolutin per milliliter of finished beer.

3. A method of inhibiting the micro-biological growth of *Lactobacillus pastorianus, Pediococcus damnosus* and secondary yeast in beer, which comprises incorporating the antibiotics polymyxin, terramycin and thiolutin in amounts of from about 3.0 to about 5.0 gamma per milliliter of finished beer.

4. Beer containing thiolutin in an amount of from about 1.0 gamma to about 3.0 gamma per milliliter and polymyxin in an amount of from about 0.5 gamma to about 5.0 gamma, whereby micro-biological growth is inhibited.

5. Beer containing thiolutin in an amount of about 3.0 gamma per milliliter and polymyxin in an amount from about 1.0 gamma to about 3.0 gamma per milliliter, whereby micro-biological growth of *Lactobacillus pastorianus, Pediococcus damnosus* and secondary yeast is inhibited.

6. Beer containing thiolutin and another member selected from the group consisting of polymyxin and a mixture of polymyxin and terramycin whereby microbiological growth of *Lactobacillus pastorianus, Pediococcus damnosus* and secondary yeast is inhibited.

References Cited in the file of this patent

FOREIGN PATENTS 905,075 France ---------------- Apr. 3, 1945

OTHER REFERENCES

Wallerstein Laboratories Communications, August 1946, vol. IX, No. 27, pages 115 to 127.

Abstract published in vol. 674 O. G., page 1368, September 29, 1953; Hesseltine 229, 296.

Journ. American Chem. Soc., vol. 74, No. 24, December 20, 1952, pages 6304–6305, article by W. C. Celmer et al.